United States Patent
Lopez

(10) Patent No.: US 11,515,959 B2
(45) Date of Patent: Nov. 29, 2022

(54) CONSTRUCTION AND APPLICATION OF AN ORTHOGONAL CODE

(71) Applicant: Telefonaktiebolaget LM Ericsson (publ), Stockholm (SE)

(72) Inventor: Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/769,279

(22) PCT Filed: Dec. 21, 2017

(86) PCT No.: PCT/SE2017/051324
§ 371 (c)(1),
(2) Date: Jun. 3, 2020

(87) PCT Pub. No.: WO2019/125253
PCT Pub. Date: Jun. 27, 2019

(65) Prior Publication Data
US 2020/0374024 A1    Nov. 26, 2020

(51) Int. Cl.
*H04B 1/7073* (2011.01)
*H04J 13/12* (2011.01)

(52) U.S. Cl.
CPC .......... *H04J 13/12* (2013.01); *H04B 1/70735* (2013.01)

(58) Field of Classification Search
CPC ...... H04B 1/707; H04B 1/70735; H04J 13/12
See application file for complete search history.

(56) References Cited

U.S. PATENT DOCUMENTS

| 7,609,749 | B1 | 10/2009 | Hall et al. |
| 8,837,270 | B2 * | 9/2014 | Zhang ............... H04L 5/0051 370/203 |

(Continued)

OTHER PUBLICATIONS

Supplementary European Search Report dated Dec. 2, 2020 for European Patent Application No. 17935759.5, 4 pages.

(Continued)

*Primary Examiner* — Alpus Hsu
(74) *Attorney, Agent, or Firm* — Sage Patent Group

(57) ABSTRACT

The present invention provides a construction of an orthogonal code that includes an encoding matrix $C_K$ having N rows and N−P+1 columns, wherein $N=P \cdot 2^K$, K is a positive integer and P is an odd positive integer, wherein the encoding matrix CK having N rows and N−P+1 columns includes selecting a code word length, N, and factoring N to determine K and P, and wherein exactly one of the columns of the encoding matrix comprises N elements having the same real non-zero value; each of the other columns of the encoding matrix comprises exactly (N−L) elements having zero value and exactly L elements having real, non-zero, alternating positive and negative values of same magnitude wherein $L \in \{2^K, 2^{K-1}, \ldots, 2^2, 2^1\}$, and wherein, for each column, elements of each of an adjacent pair of the L elements are separated by (N−L)/L elements having zero value; and no column is equal to another column.

13 Claims, 3 Drawing Sheets

(56) References Cited

U.S. PATENT DOCUMENTS

| | | | | |
|---|---|---|---|---|
| 9,112,643 | B2* | 8/2015 | Zhang | H04J 13/0048 |
| 9,264,164 | B2* | 2/2016 | Wang | H04W 72/0466 |
| 9,379,857 | B2* | 6/2016 | Zhang | H04L 5/0066 |
| 9,602,259 | B2* | 3/2017 | Zhang | H04L 5/0016 |
| 9,948,421 | B2* | 4/2018 | Zhang | H04L 5/0048 |
| 10,142,082 | B1* | 11/2018 | Shattil | H04L 27/2613 |
| 2012/0093139 | A1* | 4/2012 | Hooli | H04L 1/0618 |
| | | | | 370/337 |
| 2016/0254889 | A1 | 9/2016 | Shattil | |

OTHER PUBLICATIONS

Wu, Di et al., "Adaptive Rate QS-CDMA UWB Systems Using Ternary OVSF Codes with a Zero-Correlation Zone", Wireless Communications and Networking Conference, Apr. 3-6, 2006, Piscataway, NJ, USA, pp. 1068-1073 (6 pages).

Rintakoski, Timo et al., "Hardware Unit for OVSF/Walsh/Hadamard Code Generation", System-On-Chip, International Symposium on Tampere, Nov. 16-18, 2004, Piscataway, NJ, USA, pp. 143-145 (3 pages).

International Search Report and Written Opinion of the International Searching Authority for International Application No. PCT/SE2017/051324, dated Nov. 9, 2018.

Gerakoulis et al., "Extended Orthogonal Code Designs with Applications in CDMA," Spread Spectrum Techniques and Applications, 2000 IEEE Sixth International Symposium on Sep. 6-8, 2000, vol. 2, pp. 657-661.

Tai-Kuo Woo, "Orthogonal Variable Spreading Codes for Wide-Band CDMA," IEEE Transactions on Vehicular Technology, vol. 51, No. 4, Jul. 2002, pp. 700-709.

Cheon et al., "Sparse orthogonal matrices," Linear Algebra and Its Applications, vol. 373, 2003, pp. 211-222.

Benner et al., "SR and SZ algorithms for the symplectic (butterfly) eigenproblem," Linear Algebra and Its Applications, vol. 287, No. 1, 1999, pp. 41-76.

Wu et al., "On Visible Light Communication Using LED Array with DFT-Spread OFDM," IEEE ICC 2014—Optical Networks and Systems, pp. 3325-3330.

ZTE, "NR short PUCCH structure for more than 2-bit UCI," 3GPP TSG RAN WG1 Meeting #89, Hangzhou, P.R. China, May 15-19, 2017, R1-1707169, pp. 1-8.

* cited by examiner

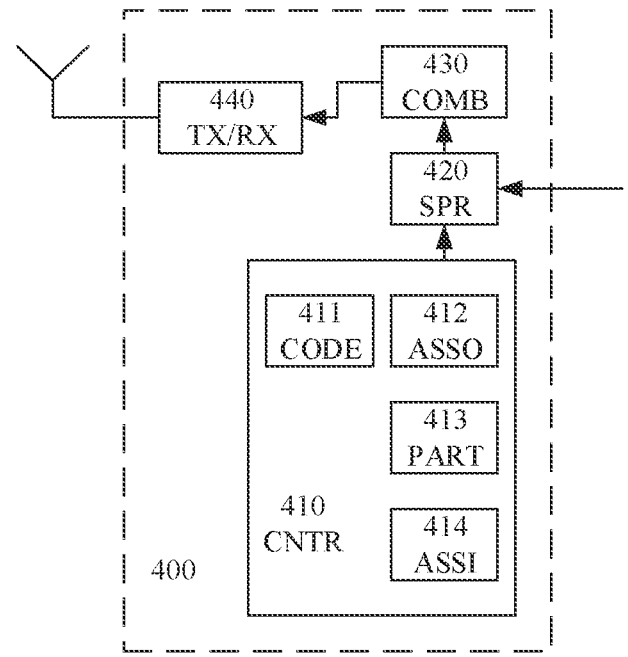
FIG. 4
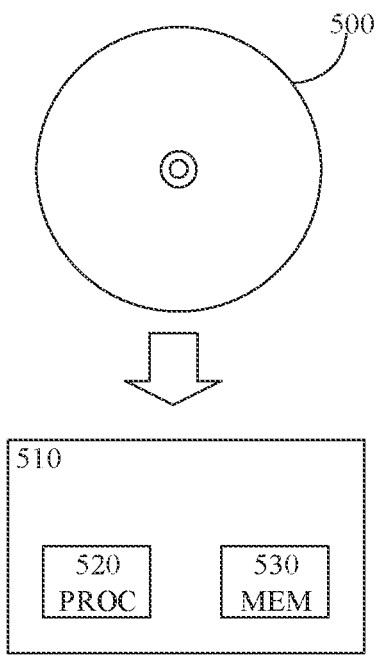
FIG. 3
FIG. 5

Table 1a: $C_K$

| 0.29 | 0.5 | 0 | 0 | 0.71 | 0 | 0 | 0 | 0 | 0 |
|---|---|---|---|---|---|---|---|---|---|
| 0.29 | 0 | 0.5 | 0 | 0 | 0.71 | 0 | 0 | 0 | 0 |
| 0.29 | 0 | 0 | 0.5 | 0 | 0 | 0.71 | 0 | 0 | 0 |
| 0.29 | -0.5 | 0 | 0 | 0 | 0 | 0 | 0.71 | 0 | 0 |
| 0.29 | 0 | -0.5 | 0 | 0 | 0 | 0 | 0 | 0.71 | 0 |
| 0.29 | 0 | 0 | -0.5 | 0 | 0 | 0 | 0 | 0 | 0.71 |
| 0.29 | 0.5 | 0 | 0 | -0.71 | 0 | 0 | 0 | 0 | 0 |
| 0.29 | 0 | 0.5 | 0 | 0 | -0.71 | 0 | 0 | 0 | 0 |
| 0.29 | 0 | 0 | 0.5 | 0 | 0 | -0.71 | 0 | 0 | 0 |
| 0.29 | -0.5 | 0 | 0 | 0 | 0 | 0 | -0.71 | 0 | 0 |
| 0.29 | 0 | -0.5 | 0 | 0 | 0 | 0 | 0 | -0.71 | 0 |
| 0.29 | 0 | 0 | -0.5 | 0 | 0 | 0 | 0 | 0 | -0.71 |

Table 1b: $F_N$

| ... | ... | 1 | ... | ... | ... | 1 | ... | ... | ... | 1 | ... |
|---|---|---|---|---|---|---|---|---|---|---|---|
| ... | ... | 0.5-0.9i | ... | ... | ... | -1 | ... | ... | ... | 0.5+0.9i | ... |
| ... | ... | -0.5-0.9i | ... | ... | ... | 1 | ... | ... | ... | -0.5+0.9i | ... |
| ... | ... | -1 | ... | ... | ... | -1 | ... | ... | ... | -1 | ... |
| ... | ... | -0.5+0.9i | ... | ... | ... | 1 | ... | ... | ... | -0.5-0.9i | ... |
| ... | ... | 0.5+0.9i | ... | ... | ... | -1 | ... | ... | ... | 0.5-0.9i | ... |
| ... | ... | 1 | ... | ... | ... | 1 | ... | ... | ... | 1 | ... |
| ... | ... | 0.5-0.9i | ... | ... | ... | -1 | ... | ... | ... | 0.5+0.9i | ... |
| ... | ... | -0.5-0.9i | ... | ... | ... | 1 | ... | ... | ... | -0.5+0.9i | ... |
| ... | ... | -1 | ... | ... | ... | -1 | ... | ... | ... | -1 | ... |
| ... | ... | -0.5+0.9i | ... | ... | ... | 1 | ... | ... | ... | -0.5-0.9i | ... |
| ... | ... | 0.5+0.9i | ... | ... | ... | -1 | ... | ... | ... | 0.5-0.9i | ... |

FIG. 6

CONSTRUCTION AND APPLICATION OF AN ORTHOGONAL CODE

CROSS REFERENCE TO RELATED APPLICATION

This application is a 35 U.S.C. § 371 national stage application of PCT International Application No. PCT/SE2017/051324 filed on Dec. 21, 2017, the disclosure and content of which is incorporated by reference herein in its entirety.

TECHNICAL FIELD

The present disclosure relates generally to the field of wireless communication. More particularly, it relates to an orthogonal code suitable for wireless communication.

BACKGROUND

Design of signals with a limited dynamic range and amenable to linear (or more generally low complexity) equalization is an area of active research.

Low complexity equalization is often used to achieve high data rates with good performance; for example in communications systems applying OFDM (orthogonal frequency division multiplexing) such as downlink communication of LTE (long term evolution) and communications compliant with IEEE802.11a/n/g/ac/ax.

A limited signal dynamic range, as measured for example by the Peak to Average Power Ratio (PAPR) or Cubic Metric (CM), is beneficial for power efficiency and extended coverage. For example, uplink communications of LTE utilizes DFT-s-OFDM (discrete Fourier transform spread OFDM), also known as SC-FDMA (Single Carrier frequency division multiple access), to generate signals with lower PAPR/CM than OFDM, while still achieving good performance with low complexity frequency domain equalization.

Recent technologies, such as NR (new radio) and VLC (visible light communications), introduce challenges in the generation of signals that offer the benefits of multicarrier technologies in terms of high data rates and multi-user multiplexing, as well as the benefits of single carrier modulations in terms of limited dynamic range. Known approaches (such as DFT-s-OFDM) are not flexible enough and/or have serious drawbacks which limit their applicability, e.g. to NR and VLC.

For example, DFT-s-OFDM is not flexible enough to design a 1-symbol short NR-PUCCH (new radio physical uplink control channel) for coverage extension, which may result in ad-hoc designs as exemplified in R1-1707169, "NR short PUCCH structure for more than 2-bit UCI" by ZTE, 3GPP TSG RAN WG1 Meeting #89, Hangzhou, China, May 15-19, 2017.

In another example, the PAPR that can be obtained by application of DFT-s-OFDM in VLC is not as low as the PAPR of DFT-s-OFDM as employed in RF (radio frequency) communications systems, due to the restriction that VLC waveforms must be real-valued (see e.g. Chaopei Wu, Hua Zhang, Wei Xu; "On visible light communication using LED array with DFT-spread OFDM", IEEE ICC 2014 Optical Networks and Systems, pp. 3325-3330).

Therefore, there is a need for alternative approaches to signal design. Preferably, such approaches provide for generation of signal waveforms that have low PAPR/CM and are well suited for high data rate systems. Also preferably, such approaches are flexible and/or generally applicable.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by an orthogonal code defined by an encoding matrix $C_K$ having N rows and N−P+1 columns, wherein $N=P\square 2^K$, K is a positive integer and P is an odd positive integer. In the encoding matrix, no column is equal to another column.

Exactly one of the columns of the encoding matrix comprises N elements having the same real non-zero value, and each of the other columns of the encoding matrix comprises exactly (N−L) elements having zero value and exactly L elements having real, non-zero, alternating positive and negative values of the same magnitude wherein $L \in \{2^K, 2^{K-1}, \ldots, 2^2, 2^1\}$. For each of the other columns, the elements of each adjacent pair of the L elements are separated by (N−L)/L elements having zero value.

In some embodiments, the exactly one of the columns is the first column of the encoding matrix.

In some embodiments, the same real non-zero value is a positive value. For example, the positive value may be equal to $1/\sqrt{N}$.

In some embodiments, the same magnitude is equal to $\sqrt{1/L}$.

According to some embodiments, a number of columns comprising exactly L elements having non-zero values is equal to N/L.

For each column, any cyclic shift of the column may be identical to one of the other columns or to one of the other columns with opposite sign for each of the non-zero values according to some embodiments.

A second aspect is a method of constructing an orthogonal code defined by an encoding matrix $C_K$. The method comprises defining the encoding matrix as having N rows and N−P+1 columns, wherein $N=P\square 2^K$, K is a positive integer and P is an odd positive integer.

The method also comprises letting exactly one of the columns of the encoding matrix comprise N elements having the same real non-zero value, and letting each of the other columns of the encoding matrix comprise exactly (N−L) elements having zero value and exactly L elements having real, non-zero, alternating positive and negative values of the same magnitude wherein $L \in \{2^K, 2^{K-1}, \ldots, 2^2, 2^1\}$. For each of the other columns, the elements of each adjacent pair of the L elements are separated by (N−L)/L elements having a zero value.

The method further comprises, for each of the columns, prohibiting the column from being equal to another column.

In some embodiments, the defining step comprises selecting a code word length, N, and factoring N to determine K and P. In some embodiments, the letting steps and the prohibiting step comprise forming an initial matrix $C_0$ having P rows and 1 column, wherein each element is equal to $1/\sqrt{P}$, and recursively determining an extended matrix $C_n$ as $$\frac{1}{\sqrt{2}}\begin{bmatrix} C_{n-1} & I_{P\cdot 2^{n-1}} \\ C_{n-1} & -I_{P\cdot 2^{n-1}} \end{bmatrix}$$

for n=1, 2, 3, ..., K to provide the encoding matrix $C_K$, wherein $I_{P\cdot 2^{n-1}}$ is an identity matrix having $P\square 2^{n-1}$ rows and $P\square 2^{n-1}$ columns.

In some embodiments, the method may further comprise constructing K+1 mutually orthogonal code subspaces $S_m$, m=0, 1, 2, ..., K, of the orthogonal code by selecting:

for the subspace $S_0$: the first column of the encoding matrix $C_K$ as a basis vector to span $S_0$, and for each of the subspaces $S_m$, m=1, 2, ..., K: $P\square 2^{m-1}$ consecutive columns of the encoding matrix $C_K$ as basis vectors to span $S_m$, wherein none of the columns of the encoding matrix $C_K$ is selected as a basis vector for two different subspaces.

A third aspect is a method for generation of a signal to be transmitted using the orthogonal code according to any the first aspect. The method comprises partitioning a sequence of transmission resources into blocks, each block comprising B transmission resources, where 1<B≤N−P+1, and partitioning each block into 1≤k≤K+1 sub-blocks, each sub-block comprising an amount of transmission resources, wherein the amount is selected from the set {1,P$\square 2^0$, P$\square 2^1$, ..., P$\square 2^{K-1}$}, and wherein no amount of the set is selected more than once for each block.

The method also comprises assigning each sub-block to transmission of a corresponding signal content, associating each sub-block with a corresponding code subspace, $S_m$, of the orthogonal code, wherein the code subspaces $S_m$, m=0, 1, 2, ..., K, are mutually orthogonal, spreading each symbol of the corresponding signal content using a column of the encoding matrix $C_K$, which column is a basis vector of the corresponding associated code subspace, and combining the spread symbols of the sub-blocks in each block to generate the signal to be transmitted.

A fourth aspect is a computer program product comprising a non-transitory computer readable medium, having thereon a computer program comprising program instructions. The computer program is loadable into a data processing unit and configured to cause execution of the method according to any of the second and third aspects when the computer program is run by the data processing unit.

A fifth aspect is an arrangement for generation of a signal to be transmitted using the orthogonal code according to the first aspect. The arrangement comprises controlling circuitry configured to cause partitioning of a sequence of transmission resources into blocks, each block comprising B transmission resources, where 1≤B≤N−P+1, and partitioning of each block into 1≤k≤K+1 sub-blocks, each sub-block comprising an amount of transmission resources, wherein the amount is selected from the set {1,P$\square 2^0$,P$\square 2^1$, ..., P$\square$2K−1}, and wherein no amount of the set is selected more than once for each block.

The controlling circuitry is also configured to cause assignment of each sub-block to transmission of a corresponding signal content, association of each sub-block with a corresponding code subspace, $S_m$, of the orthogonal code, wherein the code subspaces $S_m$, mC=0, 1, 2, ..., K, are mutually orthogonal, spreading of each symbol of the corresponding signal content using a column of the encoding matrix $C_K$, which column is a basis vector of the corresponding associated code subspace, and combining of the spread symbols of the sub-blocks in each block to generate the signal to be transmitted.

A sixth aspect is a wireless communication transmitter comprising the arrangement of the fifth aspect.

In some embodiments, any of the above aspects may additionally have features identical with or corresponding to any of the various features as explained above for any of the other aspects.

An advantage of some embodiments is that alternative approaches to signal design are provided.

Another advantage of some embodiments is that signal waveforms that have low PAPR/CM and are well suited for high data rate systems may be generated. Yet an advantage of some embodiments is that the approaches are flexible and/or generally applicable.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 3 is a flowchart illustrating example method steps according to some embodiments;

FIG. 4 is a schematic block diagram illustrating an example arrangement according to some embodiments;

FIG. 5 is a schematic drawing illustrating an example computer readable medium according to some embodiments; and FIG. 6 shows two tables illustrating an example of an encoding matrix $C_K$ and a DFT matrix $F_N$ according to some embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein. In the following, embodiments will be described where an orthogonal code having particular characteristics may be used for signal generation.

Generally, such an orthogonal code may be defined by an encoding matrix $C_K$ having N rows and N−P+1 columns, wherein N=P$\square 2^K$, K is a positive integer and P is an odd positive integer. Typically, no column of the encoding matrix is equal to another column of the encoding matrix.

Among the columns of the encoding matrix exactly one may comprise N elements having the same real non-zero value and each of the other columns may comprise exactly (N–L) elements having zero value and exactly L elements having real, non-zero, alternating positive and negative values of the same magnitude wherein $L \in \{2^K, 2^{K-1}, \ldots, 2^2, 2^1\}$. In each of the other columns, the elements of each adjacent pair of the L elements may be separated by (N–L)/L elements having zero value.

Figure 1:
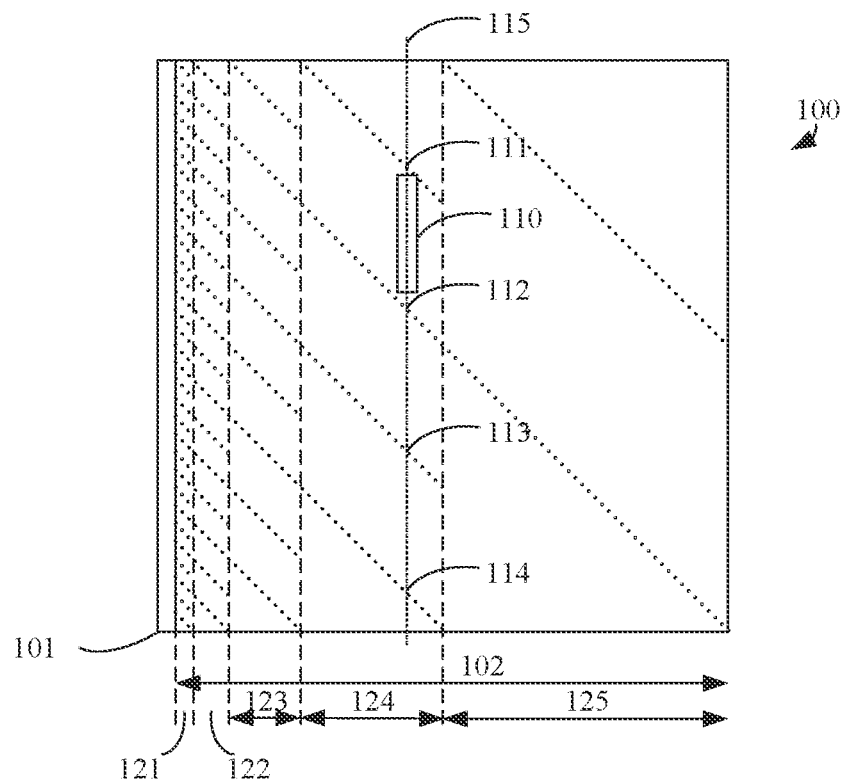
FIG. 1 is a schematic drawing illustrating an example encoding matrix according to some embodiments.

FIG. 1 schematically illustrates an example of such an encoding matrix 100 according to some embodiments. In this example, N=96, P=3, and K=5. It is easily seen that no column is equal to another column in this example.

The first column 101 of the encoding matrix 100 has N elements, each equal to $1/\sqrt{96}$ (i.e. the same real non-zero value). Generally, the same real non-zero value may typically be a positive value, for example equal to $1/\sqrt{N}$.

Each of the other columns 102 of the encoding matrix 100 comprises exactly (96–L) elements having zero value and exactly L elements having real, non-zero, alternating positive and negative values of the same magnitude. The elements having non-zero values are indicated in FIG. 1 by dotted diagonal lines.

For each of the second to fourth columns 121 there are $2^5=32$ elements having non-zero values, for each of the fifth to tenth columns 122 there are $2^4=16$ elements having non-zero values, for each of the eleventh to twenty-second columns 123 there are $2^3=8$ elements having non-zero values, for each of the twenty-third to forty-seventh columns 124 there are $2^2=4$ elements having non-zero values, and for each of the forty-eighth to ninety-fourth columns 125 there are $2^1=2$ elements having non-zero values. Thus there are 96/32=3 columns having 32 non-zero elements, 96/16=6 columns having 16 non-zero elements, 96/8=12 columns having 8 non-zero elements, 96/4=24 columns having 4 non-zero elements, and 96/2=48 columns having 2 non-zero elements. Generally, the number of columns comprising exactly L elements having non-zero values may be equal to N/L.

That the non-zero values are alternating positive and negative values of the same magnitude (not visible in FIG. 1) may be exemplified by column 115, where the magnitude of the non-zero values 111, 112, 113, 114 is the same, where the non-zero values 111 and 113 have the same sign (positive or negative) and the non-zero values 112 and 114 also have the same sign which is the opposite sign compared to that of the non-zero values 111 and 113. Generally, the same magnitude may be equal to $\sqrt{1/L}$, i.e. $\sqrt{1/32}$ in the column set 121, $\sqrt{1/16}$ in the column set 122, $\sqrt{1/8}$ in the column set 123, $\sqrt{1/4}$ in the column set 124, and $\sqrt{1/2}$ in the column set 125.

Continuing the example of column 115, it can be seen that each adjacent pair of non-zero elements (e.g. the pair of elements 111 and 112) are separated by a number, (N–L)/L, of zero-valued elements 110. The remaining zero-valued elements are located in one or more of the respective ends of the column such that the diagonal pattern of non-zero valued elements shown in FIG. 1 is provided. Thereby, any cyclic shift of a column is identical to one of the other columns, or to one of the other columns with opposite sign for each of the non-zero values.

The encoding matrix illustrated in FIG. 1 is orthogonal and has full column rank since $C_K^T \cdot C_K = I_{N-P+1}$, where $I_{N-P+1}$ is the identity matrix of dimension N–P+1. The same applies to all encoding matrices covered by this disclosure for which $C_K^T \square C_K = I_{N-P+1}$.

For moderate to large values of K, the encoding matrix $C_K$ is sparse, in the sense that it has few non-zero elements compared to its total number of elements. For example, sparseness may be defined as the ratio of the number of non-zero elements to the total number of elements falling below a sparseness threshold value. Examples of such sparseness threshold values may for example, lie in any of the intervals [0,0.1], [0,0.2], and [0,0.3]. For example, an example sparseness threshold value may be 0.1 or 0.25.

The number $n_K$ of non-zero elements in $C_K$ obeys the recursive relation $n_0=2P$, $n_m=2n_{m-1}+P2^m$, $1 \leq m \leq K$, from which it follows that $n_K=(K+1)N$. Hence, the ratio of non-zero elements to the total number of elements in $C_K$ is $$\frac{(K+1)P2^K}{P2^K(P2^K - P + 1)} = \frac{(K+1)}{(P2^K - P + 1)} \to 0 \text{ when } K \to \infty.$$

This is of practical interest because it implies that multiplication by the matrix $C_K$ has lower complexity than ordinary matrix multiplication, since a large percentage of its elements are zero-valued.

Figure 2:
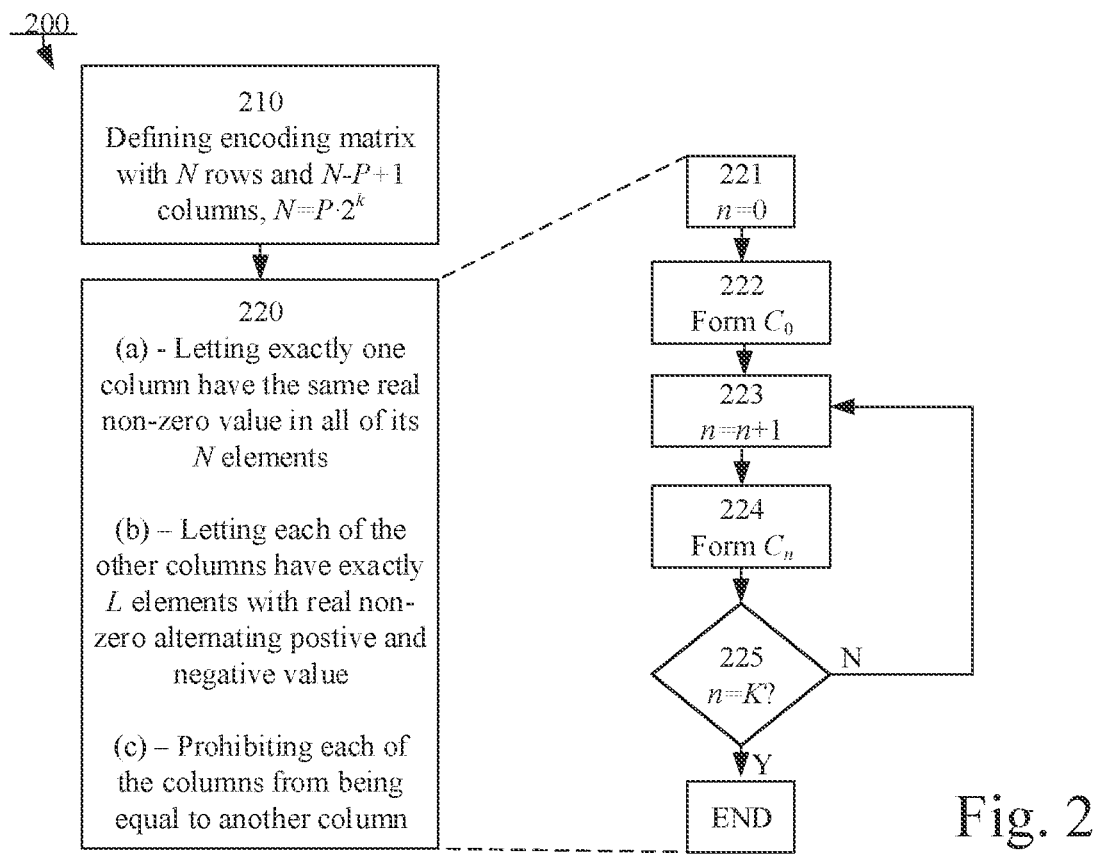
FIG. 2 is a flowchart illustrating example method steps according to some embodiments.

FIG. 2 illustrates an example method 200 of constructing an orthogonal code defined by an encoding matrix $C_K$ according to some embodiments. The method may, for example be used to construct any of the orthogonal codes as exemplified in FIG. 1 or otherwise described herein.

In step 210, the encoding matrix $C_K$ is defined as having N rows and N–P+1 columns, wherein $N=P \cdot 2^K$, K is a positive integer and P is an odd positive integer. For example, step 210 may comprise selecting a code word length, N, and factoring N to determine K and P. In step 220, the encoding matrix is constructed by:

letting exactly one of the columns of the encoding matrix comprise N elements having the same real non-zero value (220a, compare with 101 of FIG. 1), letting each of the other columns of the encoding matrix comprise exactly (N–L) elements having zero value and exactly L elements having real, non-zero, alternating positive and negative values of the same magnitude wherein $L \in \{2^K, 2^{K-1}, \ldots, 2^2, 2^1\}$, and wherein (for each column) the elements of each adjacent pair of the L elements are separated by (N–L)/L elements having a zero value (220b, compare with 121, 122, 123, 124, 125 of FIG. 1), and (for each of the columns) prohibiting the column from being equal to another column (220c, compare with 101, 121, 122, 123, 124, 125 of FIG. 1).

Typically, step 220 may further comprise fulfilling some or all of the requirements described above in connection to FIG. 1.

For example, step 220 may comprise setting a counter n to zero as illustrated in 221 and forming an initial matrix $C_0$ as illustrated by step 222. In a typical example, the initial matrix $C_0$ has P rows and 1 column, and each element of $C_0$ is equal to $1/\sqrt{P}$, which may be seen as a normalization factor.

Then, the encoding matrix $C_K$ may be provided by recursively determining an extended matrix $C_n$ as $$\frac{1}{\sqrt{2}} \begin{bmatrix} C_{n-1} & I_{P \cdot 2^{n-1}} \\ C_{n-1} & -I_{P \cdot 2^{n-1}} \end{bmatrix}$$

for n=1, 2, 3, ..., K to the encoding matrix $C_K$, wherein $I_{P \cdot 2^{n-1}}$ is an identity matrix having $P \square 2^{n-1}$ rows and $P \square 2^{n-1}$ columns, and wherein $1/\sqrt{2}$ provides normalization. In FIG. 2, this is illustrated by letting the counter increase by one in step 223, forming $C_n$ in step 224, and repeating steps 223 and 224 until a stopping criterion, n=K, is reached in step 225 whereby the encoding matrix $C_K$ is complete.

When N=96 in the process described by steps 221-225, the method results in an encoding matrix as illustrated in FIG. 1.

The encoding matrix $C_K$ as disclosed herein has properties that enable it to span K+1 mutually orthogonal code subspaces $S_m$, m=0, 1, 2, . . . , K. Orthogonality is defined in the code domain, which may translate to orthogonality in frequency domain as will be seen later on.

By definition, a linear subspace of a vector space (the code space or code domain) is spanned by the vectors $\{v_0, \ldots, v_{M-1}\}$ if any vector in the subspace can be expressed as a linear combination of $v_0, \ldots, v_{M-1}$; $\Sigma_{k=0}^{M-1} c_k v_k$ with complex coefficients $c_k$. Such a subspace may be denoted by span $\{v_0, \ldots, v_{M-1}\}$.

In a matrix A of dimension N×M wherein the M columns are numbered from 0 to M−1, any column of A can be considered as a vector in the vector space $C^N$ consisting of N-tuples of complex numbers and the m-th column of A may be denoted A(:,m). If n<m are integers, then the sequence of numbers n,n+1, . . . , m−1, m may be written as n:m, if m is multiple of a the sequence of numbers n,n+α,n+2α, . . . , m−α,m may be written as n:α:m, and if m is not a multiple of α then n:α:m may denote the sequence n,n+α,n+2α, . . . , n+kα, where k satisfies m−α<n+kα<m. The linear subspace spanned by the columns A(:,n), A(:,n+1), . . . , A(:,m) is denoted span {A(:,n:m)}.

For the example encoding matrix created via steps 221-225 of FIG. 2 and exemplified in FIG. 2, the K+1 mutually orthogonal linear code subspaces $S_m$, m=0, 1, 2, . . . , K associated with the columns of $C_K$ may be defined as:

$S_0$=span{ $C_K$(:,0)}, a one dimensional complex vector space spanned by the first column of $C_K$, and $S_m$=span{$C_K$(:, $i_{m-1}$+1: $i_m$)}, m=1, 2, . . . , K $S_m$, respective vector spaces spanned by $d_m$ consecutive columns of $C_K$, where the indices $d_m$ and $i_m$ are defined as:

$$d_m = \begin{cases} 1, & \text{if } m = 0 \\ P \cdot 2^{m-1}, & \text{if } 1 \leq m \leq K \end{cases}$$

$$i_m = \begin{cases} 0, & \text{if } m = 0 \\ d_m + i_{m-1}, & \text{if } 1 \leq m \leq K. \end{cases}$$

It is clear that each column of $C_K$ belongs to some $S_m$, 0≤m≤K, since $i_K = d_K + i_{K-1} = d_K + d_{K-1} + i_{K-2} = \ldots = d_K + \ldots + d_1 = P \Sigma_{m=1}^{K} 2^{m-1} = P(2^K - 1) = N - P$.

Hence, although not illustrated in FIG. 2, the method 200 may further comprise constructing K+1 mutually orthogonal code subspaces $S_m$, m=0, 1, 2, . . . , K, of the orthogonal code by selecting:

for the subspace $S_0$: the first column of the encoding matrix $C_K$ as a basis vectors to span $S_0$ (compare with 101 of FIG. 1); and for each of the subspaces $S_m$, m=1, 2, . . . , K: $P \cdot 2^{m-1}$ consecutive columns of the encoding matrix $C_K$ as basis vectors to span $S_m$ (compare with the sets of columns 121, 122, 123, 124, 125 of FIG. 1), wherein none of the columns of the encoding matrix $C_K$ is selected as a basis vector for two different subspaces.

These linear subspaces have a number of useful and interesting properties that make them well suited for application to transmitter and receiver technology in wireless communication:

They are mutually orthogonal, m≠n→$S_m \perp S_n$, which follows immediately from that the encoding matrix is orthogonal.

The dimensionality of $S_m$ is dim($S_m$)=$d_m$ since $S$ is spanned by $d_m$ columns and these columns are linearly independent due to that the encoding matrix is orthogonal.

The $d_m$ columns that span $S_m$ are closely related to each other in that any of these columns can be obtained by a cyclic shift of any other column in $S_m$.

If $F_N$ is the DFT matrix of size N×N, then $S_0$=span{$F_N$(:,0)} and $S_m$=span{$F_N$(:,$2^{K-m}$:$2^{K-m+1}$:N)}, m>0.

The last property implies that there is a one-to-one correspondence between linear subspaces spanned by columns of $C_K$ and linear subspaces spanned by columns of the DFT matrix. In particular, the DFT of a vector v∈$S_m$ has at most $d_m$ non-zero entries, and these correspond to the subcarrier numbers $2^{K-m}$: $2^{K-m+1}$:N. Also, if v∈$S_m$ and u ∈ $S_n$ then u and v are orthogonal in the frequency domain.

This property is exemplified in FIG. 6, Tables 1a and 1b, where FIG. 6, Table 1a shows the code matrix $C_K$ for N=12, P=3, K=2 and FIG. 6, Table 1b shows the DFT matrix $F_N$ for N=12.

The linear subspace $S_1$ is spanned by columns 1-3 of $C_K$ as emphasized in FIG. 6, Table 1a. This linear space is also generated by columns 2, 6, 10 of the DFT matrix $F_N$ as emphasized in FIG. 6, Table 1b. That it is the same subspace can be directly verified because 6·$C_K$(:,1)=$F_N$(:,2)+$F_N$(:,6)+$F_N$(:,10), and the other two columns $C_K$(:,2) and $C_K$(:,3) can also be described as linear combinations of the same 3 columns of the DFT matrix since they are cyclic shifts of $C_K$(:,1). Hence, any vector that can be written as a linear combination of $C_K$(:,1), C(:,2) and $C_K$(:,3) can be written as a linear combination of $F_N$ (:,2), $F_N$ (:,6), $F_N$(:,10). The converse is also true and follows immediately by dimension arguments, although it is also straightforward to verify it by direct calculation, for example $F_N$(:,6)=2·$C_K$(:,1), +·(:,2)+ 2·$C_K$(:,3).

The association between the encoding matrix $C_K$ and the DFT matrix $F_N$ as exemplified by Tables 1a and 1b may be used to generate signals having at least some of the desirable properties discussed earlier herein. Furthermore, flexible multiplexing may be achieved since the different subspaces may be used to separate different signal parts such as different users. In the receiver of such signals, (linear) equalization may be simplified due to the sparseness of the code. For example, the information carried by constellation symbols (e.g. quadrature amplitude modulation, QAM, symbols) can be recovered by multiplication of the received samples by the transpose of the code matrix, since this matrix is orthogonal. Because of the sparseness, matrix multiplication can be implemented efficiently, since scalar multiplications by the terms with zero values may be skipped.

Thus, the signal design is based on an orthogonal code as explained herein. The signal constellation symbols (e.g. pulse amplitude modulation, PAM, or quadrature amplitude modulation, QAM) may be spread by multiplication of each symbol with a corresponding code word (a.k.a. a column of the encoding matrix or a basis vector of a subspace). The length of the code words may be equal to the minimum size of FFT (fast Fourier transform) and/or DFT required at the receiver side in order to perform frequency domain equalization (compensating the effect of the channel by means of frequency domain processing).

Furthermore, the signal parts can be separated at the receiver by means of the DFT, since the components of the signal corresponding to different subspaces are carried by orthogonal frequency domain subcarriers.

Embodiments may also be employed in OFDM-based systems in which case there are one or more pre-defined FFT sizes. In NR, a typical FFT size is N=96 and in IEEE802.11ax, a typical FFT size is N=256 (P=1, K=8).

FIG. 3 illustrates an example method 300 for generation of a signal to be transmitted using the orthogonal code according to some embodiments.

In step 310, a sequence of transmission resources (e.g. symbols) is partitioned into blocks, each block comprising B transmission resources, where $1 \leq B \leq N-P+1$, and in step 320 each block is partitioned into $1 \leq k \leq K+1$ sub-blocks, each sub-block comprising an amount of transmission resources, wherein the amount is selected from the set $\{1, P \square 2^0, P \square 2^1, \ldots P \square 2^{K-1}\}$, and wherein no amount of the set is selected more than once for each block. Thus, the size of each of the sub-blocks corresponds to the dimensionality of a corresponding sub-space of $C_K$.

In step 330, each sub-block is assigned to transmission of a corresponding signal content, e.g. to a particular user, reference symbols, etc., and instep 340, each sub-block is associated with a corresponding code subspace, $S_m$, of the orthogonal code.

In step 350, each symbol of the corresponding signal content is spread using a column of the encoding matrix $C_K$, which column is a basis vector of the corresponding associated code subspace, and in step 360 the spread symbols of the sub-blocks in each block are combined to generate the signal to be transmitted. The method may also comprise transmitting the generated signal as illustrated by step 370.

A few example applications of the method described in FIG. 3 will now be given.

Example 1: Single User Transmission, Single Antenna Port

This example relates to signal generation for a single transmitter (TX) chain and a single user. As will be seen below, the principles may be generalized to other scenarios, e.g. for multiple users and/or multiple transmitter chains.

The bit stream to be transmitted is mapped to complex-valued or real-valued symbols drawn from a symbol constellation (e.g. QAM, PAM, or PSK-phase shift keying). The constellation symbols are grouped (partitioned) into blocks of size B, e.g. blocks having maximum size B=N−P+1. If a block consists of less than N−P+1 constellation symbols, it may be filled up to contain exactly N−P+1 symbols by adding zeros.

Each block is further partitioned into K+1 sub-blocks, each having size $d_m$ (by construction, $\Sigma_{m=0}^{K} d_m B = N-P+1$, the total number of columns in $C_K$). The symbols partitioned into each sub-block may serve some specific purpose, which may differ from sub-block to sub-block. For example, one sub-block may comprise pilot symbols or reference symbols for channel estimation, channel tracking, or phase tracking, while another sub-block may comprise data symbols.

Each of the constellation symbols in the sub-block of size $d_m$ is spread over a corresponding basis vector of $\mathcal{S}_m$ (one symbol per basis vector) and the result is combined by vector addition over the sub-space $\mathcal{S}_m$ to generate a resulting vector $x_m$. By definition $x_m \in \mathcal{S}_m$ and $x_m$ and $x_n$ are orthogonal in the frequency domain for $n \neq m$. If the constellation symbols are considered as a vector $v_m = [v_{i_{m-1}}+1, \ldots, v_{i_m}]^T$ of length $d_m$, then the resulting vector $x_m$ is given by $x_m = \Sigma_{j=i_{m-1}}^{i_m} 1 v_j C_K(:,j) = C_K(:,i_{m-1}+1: i_m) v_m$.

A transmission symbol x of size N, i.e. the digital baseband signal corresponding to one modulation symbol (sampled at the symbol rate), is obtained by combining the vectors $x_i$, using vector addition: $x = \Sigma_{m=0}^{K} x_m$. Alternatively, if the constellation symbols are stacked into a vector $v = [v_0 \ldots v_K]^T$ then x can be generated by applying the matrix $C_K$ as a linear transform to the intput vector of constellation symbols: $x = C_K \square v$. The transmission symbol x are concatenated (possibly after addition of a cyclic prefix), forwarded to an ADC (analog-to-digital converter), up-converted to RF, amplified and transmitted.

Example 2: Multiple Users

Multi-user multiplexing can be performed in the code domain, in the frequency domain, or simultaneously in both. For example, one or more subspaces can be assigned to one user, so that its baseband signal $x_m$ belongs to $\mathcal{S}_m$, and other orthogonal subspaces can be assigned to different users, whereby up to K users can be orthogonally multiplexed.

Example 3: Multiple TX Ports

When multiple TX ports are available, it may be advantageous to map different antenna ports to different subspaces. If the linear subspace $\mathcal{S}_m$ is mapped to a particular TX antenna port, then the component $x_m$ of the baseband signal is transmitted through that antenna. This approach may result in higher power efficiency at the transmitter than if this approach was not used.

Taking VLC systems as an example, a photodetector is typically thousands of wavelengths in linear size (and millions of square wavelengths in area), and therefore gives spatial diversity that prevents multi-path fading. A photodetector functions as an antenna array with a large amount of antenna elements, wherein the received signal at the antenna elements are squared, filtered, and added. Hence, a mapping from linear subspaces to antenna ports that yields a low PAPR at each TX port may result in increased power efficiency in the sense of increased SNR at the receiver, when compared to traditional RF diversity techniques.

Example 4: Subspace Specific Symbol Rotations

Reduction of the PAPR can be achieved by introducing subspace specific rotations. That is, it may be advantageous to select angles $\theta_m$ such that the digital baseband signal $x = \Sigma_{m=0}^{K} e^{j\theta_m} x_m$ has lower PAPR than the signal $x = \Sigma_{m=0}^{K} x_m$.

Moving on from these examples to FIG. 4, an example arrangement 400 for generation of a signal to be transmitted using the orthogonal code according to some embodiments is schematically illustrated. The arrangement may, for example, be comprised in a wireless communication transmitter. The arrangement comprises controlling circuitry (CNTR, e.g. a controller or processor) 410 configured to cause execution of the method as described in connection with FIG. 3.

To this end the controlling circuitry may comprise or be otherwise associated with storing circuitry (CODE, e.g. a memory) 411 configured to store information indicative of the encoding matrix $C_K$. Possibly, but not necessarily, the controlling circuitry may also be configured to cause construction of (e.g. construct) the encoding matrix $C_K$.

The controlling circuitry may also comprise or be otherwise associated with partitioning circuitry (PART, e.g. a practitioner) 413 configured to partition a sequence of transmission resources into blocks and each block into sub-blocks, as described above.

The controlling circuitry may also comprise or be otherwise associated with assignment circuitry (ASSI, e.g. an assigner) 414 configured to assign each sub-block to transmission of a corresponding signal content.

The controlling circuitry may also comprise or be otherwise associated with association circuitry (ASSO, e.g. an associator) 412 configured to associate each sub-block with a corresponding code subspace of the orthogonal code.

The controlling circuitry may also comprise or be otherwise associated with spreading circuitry (SPR, e.g. a spreader) 420 configured to spread each symbol of the corresponding signal content using a column of the encoding matrix $C_K$ as described above.

The controlling circuitry may also comprise or be otherwise associated with combining circuitry (COMB, e.g. a combiner) 430 configured to combine the spread symbols of the sub-blocks in each block to generate the signal to be transmitted.

The controlling circuitry may also comprise or be otherwise associated with transmitting circuitry (e.g. a transmitter; here illustrated as part of a transceiver TX/RX) 430 configured to transmit the generated signal.

In various embodiments one or more of the storing circuitry, the partitioning circuitry, the assignment circuitry, the association circuitry, the spreading circuitry, the combining circuitry and the transmitting circuitry may also be comprised in the arrangement 400.

Thus, a sparse orthogonal code is introduced which may be used in signal generation such that the modulation symbols are spread over orthogonal code words. Because of the sparsity, the resulting time-domain waveform resembles a waveform generated by single carrier modulation, with low PAPR/CM.

The code words correspond to basis vectors that can be grouped to generate orthogonal subspaces. The subspaces are also orthogonal in the frequency domain, which provides for frequency domain multiplexing, code domain multiplexing, or a combination.

Suitable receiver algorithms are very similar to those employed in an FFT-based DFT-s-OFDM receiver with frequency domain equalization; and have similar complexity. In one example, the receiver may comprise cyclic prefix removal, FFT, frequency domain equalization, IFFT (inverse FFT), correlation with the encoding matrix $C_K$ (i.e. de-spreading), modulation symbol de-mapping and channel decoding. All of these blocks may be re-used from a DFT-s-OFDM receiver, with exception of the correlation with the encoding matrix. If the vector r contains the received signal sampled at the symbol rate after equalization, then the de-spreading comprises correlating r with the basis vectors of the code (i.e. the columns of the code matrix $C_K$), which can be expressed as $C_K^T r$.

When the signal is generated such that the baseband signal component $x_m$ is modulated only by reference symbols, then a frequency domain channel estimate can be generated by projection of the received samples onto a linear subspace, time domain channel estimation (e.g. least squares estimation) and application of FFT. More generally, the reference symbols may modulate several components of the baseband signal, say $x_m, x_n, \ldots, x_q$, wherein the projection operation projects the received signal into the union of the subspaces $S_m, S_n, \ldots, S_q$.

Various embodiments described herein may be suitable for use in NR to design 1-symbol short NR-PUCCH for coverage extension and/or in VLC to generate waveforms appropriate for dimmable lights or other applications requiring high SNR (signal-to-noise ratio) and low output power.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication transmitter.

Embodiments may appear within an electronic apparatus (such as a wireless communication transmitter) comprising arrangements, circuitry, and/or logic according to any of the embodiments described herein. Alternatively or additionally, an electronic apparatus (such as a wireless communication transmitter) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication transmitter (e.g. a wireless communication device or a network node) 510. When loaded into the data processing unit, the computer program may be stored in a memory (MEM) 530 associated with or comprised in the data-processing unit.

According to some embodiments, the computer program may, when loaded into and run by the data processing unit, cause execution of method steps according to, for example, any of the methods illustrated in FIGS. 2 and 3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for generation of a signal to be transmitted using an orthogonal code, the method comprising:
    partitioning a sequence of transmission resources into blocks, each block comprising B transmission resources, where 1≤B≤N−P+1, wherein N and N−P+1 are defined as rows and columns respectively in an encoding matrix $C_K$, wherein B and N are positive integers, and wherein P is an odd positive integer;
    partitioning each block into 1≤k≤K+1 sub-blocks, each sub-block comprising an amount of transmission resources, wherein the amount is selected from the set $\{1, P \cdot 2^0, P \cdot 2^1, \ldots, P \cdot 2^{K-1}\}$, wherein no amount of the set is selected more than once for each block, and wherein K is a positive integer;
    assigning each sub-block to transmission of a corresponding signal content;
    associating each sub-block with a corresponding code subspace, $S_m$, of the orthogonal code, wherein the code subspaces $S_m$, m=0, 1, 2, . . . , K, are mutually orthogonal;
    spreading each symbol of a plurality of symbols of the corresponding signal content using a column of the encoding matrix $C_K$, which column is a basis vector of the corresponding associated code subspace; and
    combining each of the spread symbols of the sub-blocks in each block to generate the signal to be transmitted.

2. A computer program product comprising a non-transitory computer readable medium, having thereon a computer program comprising program instructions, the computer program being loadable into a data processing unit and configured to cause execution of the method according to claim 1 when the computer program is run by the data processing unit.

3. The method of claim 1, wherein the orthogonal code defined by the encoding matrix $C_K$ is constructed by
    defining the encoding matrix as having N rows and N−P+1 columns, wherein $N=P \cdot 2^K$, wherein the defining comprises selecting a code word length, N, and factoring N to determine K and P;
    letting exactly one of the columns of the encoding matrix comprise N elements having a same real non-zero value;
    letting each of the other columns of the encoding matrix comprise exactly (N−L) elements having zero value and exactly L elements having real, non-zero, alternating positive and negative values of same magnitude, wherein $L \in \{2^K, 2^{K-1}, \ldots, 2^2, 2^1\}$, wherein, for each column, elements of each of an adjacent pair of the L elements are separated by (N−L)/L elements having a zero value, and wherein L is a positive integer; and
    for each of the columns, prohibiting the column from being equal to another column.

4. The method of claim 3, wherein the letting and the prohibiting process comprise:
    forming an initial matrix $C_0$ having P rows and 1 column, wherein each element is equal to $1/\sqrt{P}$; and recursively determining an extended matrix $C_n$ as $$\frac{1}{\sqrt{2}} \begin{bmatrix} C_{n-1} & I_{P \cdot 2^{n-1}} \\ C_{n-1} & -I_{P \cdot 2^{n-1}} \end{bmatrix}$$

for n=1, 2, 3, . . . , K to provide the encoding matrix $C_K$, wherein $I_{P \cdot 2_{n-}}{}^I$ is an identity matric having $P \cdot 2^{n-1}$ rows and $P \cdot 2^{n-1}$ columns.

5. The method of claim 4, further comprising constructing K+1 mutually orthogonal code subspaces $S_m$, m=0, 1, 2, . . . , K, of the orthogonal code by selecting:
    for the subspace $S_0$: the first column of the encoding matrix $C_K$ as a basis vector to span $S_0$; and
    for each of the subspaces $S_m$, m=1, 2, . . . , K: $P \cdot 2^{m-1}$ consecutive columns of the encoding matrix $C_K$ as basis vectors to span $S_m$,
    wherein none of the columns of the encoding matrix $C_K$ is selected as a basis vector for two different subspaces.

6. An arrangement for generation of a signal to be transmitted using an orthogonal code, the arrangement comprising controlling circuitry that comprises:
    a partitioning circuitry configured to partition a sequence of transmission resources into blocks, each block comprising B transmission resources, where 1≤B≤N−P+1, wherein N and N−P+1 are defined as rows and columns respectively in an encoding matrix $C_K$, wherein B and N are positive integers, and wherein P is an odd positive integer;
    the partitioning circuitry configured to partition each block into 1≤k≤K+1 sub-blocks, each sub-block comprising an amount of transmission resources, wherein the amount is selected from the set $\{1, P \cdot 2^0, P \cdot 2^1, \ldots, P \cdot 2^{K-1}\}$, wherein no amount of the set is selected more than once for each block, and wherein K is a positive integer;
    an assignment circuitry configured to assign each sub-block to transmission of a corresponding signal content;
    an association circuitry configured to associate each sub-block with a corresponding code subspace, $S_m$, of the orthogonal code, wherein the code subspaces $S_m$, m=0, 1, 2, . . . , K, are mutually orthogonal;
    a spreading circuitry configured to spread each symbol of a plurality of symbols of the corresponding signal content using a column of the encoding matrix $C_K$, which column is a basis vector of the corresponding associated code subspace; and
    a combining circuitry configured to combine each of the spread symbols of the sub-blocks in each block to generate the signal to be transmitted.

7. A wireless communication transmitter comprising the arrangement of claim 6.

8. The arrangement of claim 6, wherein the orthogonal code comprising the encoding matrix $C_K$ having N rows and N−P+1 columns, wherein $N=P\ 2^K$, wherein the encoding matrix $C_K$ having N rows and N−P+1 columns in the orthogonal code comprises selecting a code word length, N, and factoring N to determine K and P, and wherein:
    exactly one of the columns of the encoding matrix comprises N elements having a same real non-zero value;
    each of the other columns of the encoding matrix comprises exactly (N−L) elements having zero value and exactly L elements having real, non-zero, alternating positive and negative values of same magnitude, wherein $L \in \{2^K, 2^{L-1}, \ldots, 2^2, 2^1\}$, and wherein, for each column, elements of each of an adjacent pair of the L elements are separated by $(N-L)/L$ elements having zero value; and no column is equal to another column.

9. The arrangement of claim 8, wherein the exactly one of the columns is a first column of the encoding matrix.

10. The arrangement of claim 8, wherein the same real non-zero value is a positive value and wherein the positive value is equal to $1/\sqrt{N}$.

11. The arrangement of claim 8, wherein the same magnitude is equal to $\sqrt{1/L}$.

12. The arrangement of claim 8, wherein a number of columns comprising exactly L elements having non-zero values is equal to $N/L$.

13. The arrangement of claim 8, wherein, for each column, any cyclic shift of the column is identical to one of the other columns or to one of the other columns with opposite sign for each of the non-zero values.

\* \* \* \* \*